United States Patent [19]
van der Lely et al.

[11] 4,124,078
[45] Nov. 7, 1978

[54] AGRICULTURAL IMPLEMENTS

[75] Inventors: Cornelis van der Lely, Zug, Switzerland; Ary van der Lely, Maasland; Cornelis J. G. Bom, Rozenburg, both of Netherlands

[73] Assignee: C. van der Lely N.V., Maasland, Netherlands

[21] Appl. No.: 690,880

[22] Filed: May 28, 1976

[30] Foreign Application Priority Data

Jun. 2, 1975 [NL] Netherlands ............................ 7506493
Jun. 12, 1975 [NL] Netherlands ............................ 7506984

[51] Int. Cl.² .................................................. A01B 33/06
[52] U.S. Cl. ................................... 172/59; 308/178; 74/608
[58] Field of Search ................... 172/59, 49, 111; 308/187.1, 187.2, 139, 161, 216, 186, 230, 187, 178; 74/608, 609, 421

[56] References Cited
U.S. PATENT DOCUMENTS

| | | | |
|---|---|---|---|
| 2,156,739 | 5/1939 | Schmitter | 308/139 |
| 3,586,404 | 6/1968 | Zahn | 308/187.2 |
| 3,628,837 | 12/1971 | Otto | 308/187 |
| 3,971,445 | 7/1976 | Lely | 172/59 |

*Primary Examiner*—Richard J. Johnson
*Attorney, Agent, or Firm*—Mason, Mason & Albright

[57] ABSTRACT

A rotary harrow or cultivator has a frame including an elongated frame portion that supports a row of soil working members. Each soil working member has a substantially vertical shaft supported on the frame portion by upper and lower bearing connections. The shafts each have a pinion gear in mesh with neighboring pinion gears and these gears are housed within the frame portion between the upper and lower bearing connections. If the upper bearing fractures, the fragments thereof are retained by a protective member which can be a separate plastic annular member having a chamber that surrounds each shaft, or the bearing connection can be formed by two separable portions that are bolted together and secured in a top cover of the frame portion. In either case, the bearing fragments are retained and cannot become lodged between the meshed gears. The frame portion can be linked to the remainder of the frame by parallelogram links that interconnect rigid supports on the forward frame portion to horizontal beams of the frame. A supporting roller at the rear of the frame portion is connected to the beams by arms that can be set to support the frame at chosen vertical heights above the ground. The frame portion with soil working members can "float" through the linkage connections to accommodate ground irregularities. The rear of the frame portion is supported on the frame by compression spring-bracket connections to a rear horizontal beam of the frame.

18 Claims, 10 Drawing Figures

AGRICULTURAL IMPLEMENTS

This invention relates to agricultural implements of this kind which comprise a frame portion in which a shaft is rotatably mounted, said shaft being provided with a toothed pinion in the frame portion and being rotatably journalled relative to the frame portion by a bearing that is located at or near one end of the shaft.

According to one aspect of the invention, there is provided an agricultural implement of the kind set forth, wherein means is provided which, in the event of a failure and break up of said bearing during operation of the implement, will tend to prevent pieces thereof from damaging said pinion and any other neighbouring rotary members.

For a better understanding of the invention, and to show how the same may be carried into effect, reference will now be made, by way of example, to the accompanying drawings, in which:

FIG. 6 is a section, to an enlarged scale, taken on the line VI—VI in FIG. 4, FIGS. 7, 8 and 9 are sectional views that are similar to an upper part of FIG. 6 of the drawings but that show three alternative embodiments in accordance with the invention.

Figure 1:
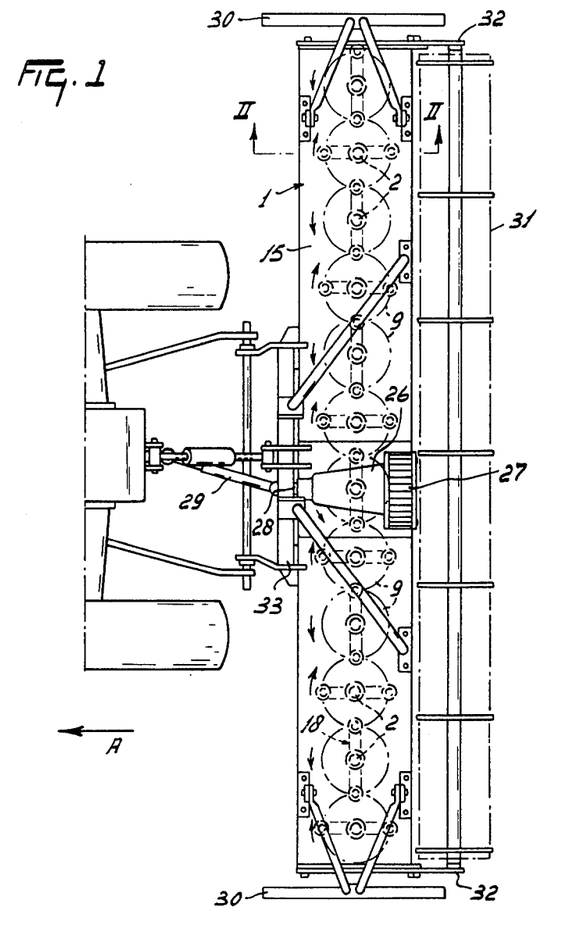
FIG. 1 is a plan view of a soil cultivating implement in accordance with the invention in the form of a rotary harrow connected to the rear of an agricultural tractor.
Figure 2:
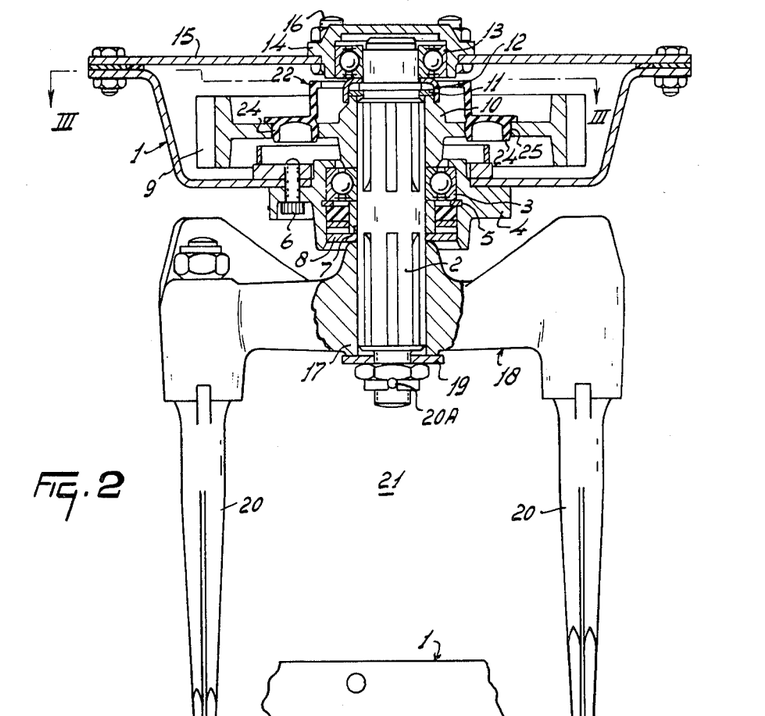
FIG. 2 is a section, to an enlarged scale, taken on the line II-II in FIG. 1.
Figure 3:
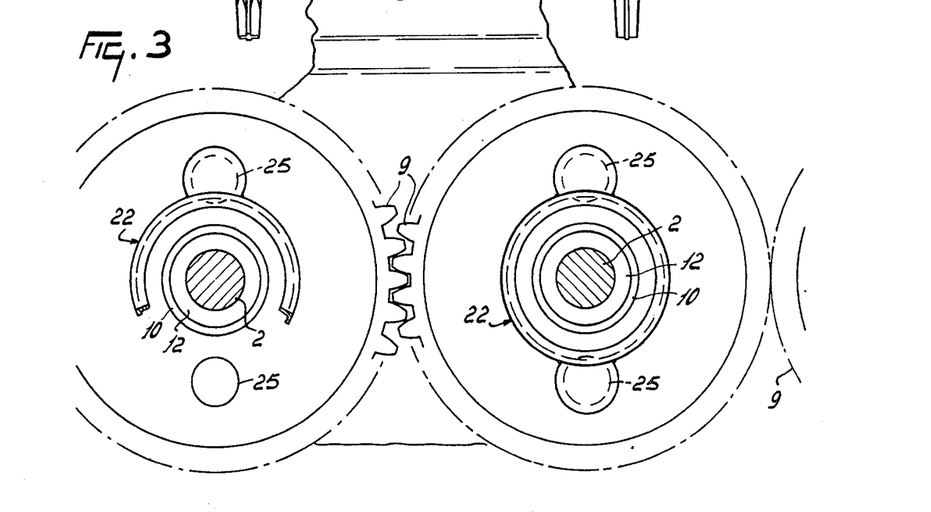
FIG. 3 is a section, to an enlarged scale, taken on the line III-III in FIG. 1.
Figure 4:
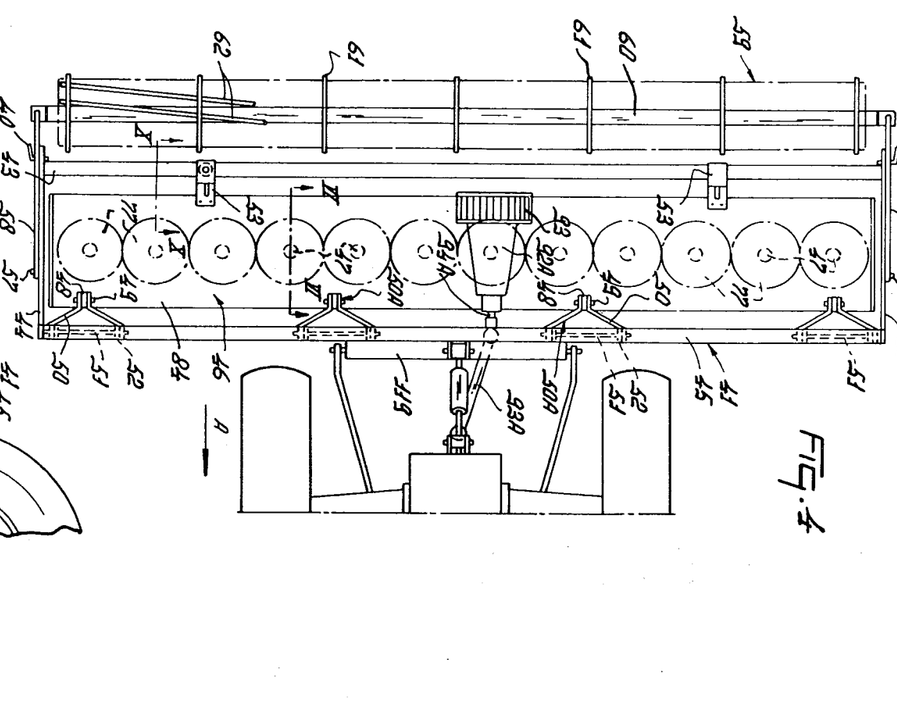
FIG. 4 is a plan view illustrating an alternative form of soil cultivating implement in accordance with the invention connected to the rear of an agricultural tractor.

Referring to FIGS. 1 to 3 of the drawings, the agricultural implement that is illustrated is a soil cultivating implement in the form of a rotary harrow, said implement comprising a hollow frame portion 1 that extends substantially horizontally transverse, and usually substantially horizontally perpendicular, to the intended direction of operative travel of the implement which is indicated in FIG. 1, and similarly in FIG. 4, by a arrow A. A plurality, in the case twelve, of substantially vertical or at least upwardly extending shafts 2 are rotatably mounted in the hollow frame portion 1 in a single row that is parallel to the major dimension of the frame portion 1, the axes of rotation of the shafts 2 being spaced apart from one another at regular intervals that preferably have magnitudes of substantially 25 centimeters. Each shaft 2 projects from beneath the bottom of the hollow frame portion 1 and is rotatably supported at a location substantially midway along its upright length by a lower ball bearing 3 arranged inside a corresponding housing 4. The outer race of the lower ball bearing 3 in each bearing housing 4 is enclosed between an inwardly directed lip at the upper end of that housing and a circlip 5 whose outer edge is received in a groove in the concave inner wall of the housing 4. The housings 4 are maintained in positions in openings in the lower wall of the hollow frame portion 1 by vertically disposed bolts 6 whose screwthreaded shanks co-operate with matchingly screwthreaded holes in anchoring members that are located immediately above the lower wall of the housing portion 1 in surrounding relationship with the openings that receive upper parts of the housing 4. Each shaft 2 is surrounded, inside the corresponding lower bearing housing 4, by a sleeve 7 whose upper end abuts against the lower end of the inner race of the corresponding bearing 3 and whose lower end contacts the upper surface of an annular sealing ring 8 that surrounds the shaft 2 at a location just inside the downwardly directed mouth of the bearing housing 4 concerned. As will be evident from FIG. 2 of the drawings, each sleeve 7 is, in turn, surrounded by a part-flexible sealing ring at a location between the annular sealing ring 8 and the overlying circlip 5.

An upper splined portion or each shaft 2 that is located substantially wholly inside the hollow frame portion 1 carries the correspondingly internally splined hub 10 of a pinion 9 that is straight-toothed or spur-toothed. The lower end of the hub 10 abuts against the upper end of the inner race of the corresponding lower ball bearing 3. The upper end of each hub 10 contacts the lower surface of a corresponding circlip 11, said circlip 11 being arranged with its inner edge in a groove formed in the corresponding shaft 2 immediately above the upper splined portion of that shaft, the outer edge of the circlip 11 being surrounded by an annular hood 12 of inverted cup-shaped configuration. The internal edge of each annular hood 12 surrounds a plain portion of the corresponding shaft 2 at a location immediately above a flange that is disposed between said portion and the groove with which the corresponding circlip 11 co-operates. The upper plain portion of each shaft 2 is also surrounded by the inner race of a corresponding upper ball bearing 13 which race co-operates with the flange that has just been mentioned in maintaining the corresponding annular hood 12 in its appointed position. Each upper ball bearing 13 is arranged in a corresponding upper bearing housing 14, the housing being entered in an opening in a flat upper wall or cover plate 15 of the frame portion 1 and being secured to that wall or plate 15 by vertically disposed bolts 16.

The lower surface of the annular sealing ring 8 at substantially the bottom of each lower bearing housing 4 abuts against the upper end of the central hub 17 of a corresponding substantially horizontally disposed tine support 18. As can be seen in FIG. 2 of the drawings, a lower portion of each shaft 2 is also splined and the hubs 17 of the tine supports 18 are internally splined in a matching manner so that they will be immovable turnably relative to the shafts 2. Each support 18 is maintained in its appointed axial position lengthwise of the corresponding shaft 2 by a washer 19 and a fastening nut 20A which is provided with a positive retaining member in the form of a split pin. The lowermost end of each shaft 2 has a short screwthreaded portion of smaller diameter than the remainder of the shaft and the washer 19 and nut 20A are mounted on this portion. When the nut 20A is tightened, the upper surface of the washer 19 bears firmly against the lowermost end of the corresponding support hub 17. The opposite ends of each support 18 are provided with sleeve-like tine holders whose longitudinal axes extend substantially parallel to the axis of rotation of the shaft 2 concerned. Each holder receives the fastening portion of a corresponding rigid soil working tine 20 that also has a soil working portion that extends downwardly away from the fastening portion. Each support 18, its tine holders and the corresponding pair of tines 20 affords a soil working or cultivating member that is generally indicated by the reference 21.

The top of each toothed pinion 9 is provided, inside the hollow frame portion 1, with a protective member 22 that is of generally cylindrical configuration and whose diameter is substantially the same as that of the corresponding upper bearing housing 14. The upper ends of the protective members 22 are located at a level immediately beneath that of the lower ends of the upper bearing housings 14. Reference to FIGS. 2 and 3 of the drawings will show that each protective member 22 is arranged co-axially around the corresponding shaft 2 and that its uppermost end is formed with a narrow inwardly directed lip or flange. Each protective member 22 is formed, at its lower end, with a pair of diametrically opposed projections 24 that incorporate downwardly directed cap-shaped extensions. Each pinion 9 is formed, between its hub 10 and its teeth, with two diametrically opposed holes 25 and it can be seen from FIGS. 2 and 3 of the drawings that the cap-shaped extensions of the projections 24 fit retainingly in the corresponding pair of holes 25. Each protective member 22 and the corresponding projections 24 are formed integrally and preferably from a synthetic plastics material having some resilience so that the hollow cap-shaped extensions of the projections 24 will undergo some resilient deformation as they are entered into the holes 25 and will thereafter tend to remain engaged with the rims of those holes than to be loose relative thereto.

The row of pinions 9 that corresponds to the row of shafts 2 and of soil working or cultivating members 21 is so arranged that the teeth of each pinion 9 are in mesh with those of its neighbour, or both of its neighbours, in that row so that rotation of one pinion 9 will cause rotation, in alternately opposite directions, of all of the others. One of the center pair of shafts 2 has an upward extension through the upper wall or cover plate 15 of the frame portion 1 into a gear box 26 that is mounted on top of said upper wall or cover plate 15. Bevel pinions located inside the gear box 26 place the shaft extension in driven connection with a shaft (not visible) that extends substantially horizontally parallel to the direction A. The rearmost end of this substantially horizontal shaft, and the rearmost end of an overlying and parallel shaft 28 both project into a change-speed gear 27 that is mounted at the back of the gear box 26. The rearmost ends of both the shaft 28 and the underlying and parallel shaft that project into the change-speed gear 27 are both splined or otherwise keyed to enable interchangeable and/or exchangeagle straight-toothed or spur-toothed pinions (not shown) to be mounted on those ends in intermeshing relationship. The pinions in question are of various sizes so that the transmission ratio between the shaft 28 and the underlying parallel shaft will depend upon the particular pair of them that is selected and the arrangement thereof that is made in the change-speed gear 27. The speed of rotation of all of the soil working or cultivating members 21 can thus be increased, or decreased, as may be required without changing the input speed of rotation that is applied to the leading end of the shaft 28, said leading end projecing forwardly with respect to the direction A from the front of the gear box 26 and being splined or otherwise keyed to enable it to be placed in driven connection with the power take-off shaft of an agricultural tractor or other operating vehicle by way of an intermediate telscopic transmission shaft 29 that is of a construction which is known per se having universal joints at its opposite ends.

Two substantially vertical shield plates 30 that usually extend substantially parallel to the direction A are arranged at short distances beyond the opposite ends of the single row of soil working or cultivating members 21. The shield plates 30 are shaped so that their lower edges can slide over the ground surface in substantially the direction A during operation of the implement and each shield plate 30 is connected by a corresponding pair of arms to pivotal mountings on the top of the hollow frame portion 1 that are arranged to define a corresponding axis that is substantially horizontally parallel to the direction A. This arrangement enables each shield plate 30 to move upwardly and downwardly to match any undulations in the surface of the ground that the implement may meet during its operative progress in the direction A. The shield plates 30 co-operate with the neighbouring soil working or cultivating members 21 in minimising ridging of the soil at the opposite edge of the broad strip of land that is worked by the members 21 and also very greatly minimise the number of stones and the like that are flung laterally of the path of travel of the implement by the rapidly moving tines 20 with a consequent very marked reduction in the danger from such causes to adjacent persons, livestock and property. The opposite ends of the hollow frame portion 1 are closed by plates alongside which arms 32 are turnable upwardly and downwardly about a substantially horizontal axis that is defined by pins, pivot bolts or the like that are located at substantially the tops and fronts of said plates with respect to the direction A. The arms 32 project rearwardly behind the end plates of the frame portion 1 with respect to the direction A and substantially horizontally aligned bearings at their rearmost ends rotatably receive a supporting member 31, in the form of an open ground roller, between them. The supporting member 31 extends throughout substantially the whole of the working width of the row of soil working or cultivating members 21 and the level of its substantially horizontal axis of rotation relative to that of the frame portion 1 is dictated by entering bolts or equivalent horizontal locking pins through holes in the arms 32 and chosen one of rows of holes that are formed near to the rearmost edges of the end plates of the frame portion 1 at equal distances from the axis about which said arms 32 are upwardly and downwardly turnable. The level of the axis of rotation of the supporting member 31 that is chosen relative to that of the hollow frame portion 1 is a principal factor in determining the maximum depth to which the tines 20 can penetrate into the soil during the use of the implement. The front of the frame portion 1 with respect to the direction A is provided, midway across the width thereof, with a coupling member or trestle 33 that is of substantially triangular configuration. The coupling member or trestle 33 is constructed and arranged for connecting the implement to the three-point lifting device or hitch of an operating tractor or other vehicle in a manner which is generally known per se and which is illustrated in outline in FIG. 1 of the drawings.

When the implement is in use, rotary drive is transmitted from the rear power take-off shaft of the agricultural tractor or other vehicle which moves and operates the implement, in such a way that the soil working or cultivating members 21 revolve around the axes of the corresponding shafts 2 in the alternately opposite directions that are indicated by small arrows in FIG. 1 of the drawings. Since the spacing between the tips of the soil working portions of the two tines 20 of each member 21 is a little greater than is the spacing between the axes of rotation of neighbouring members 21, the strips of land that are worked by those members 21 overlap one another to produce a single broad strip of worked soil. Any unbroken lumps of soil that are left on the ground surface by the tines 20 tend to be crushed by the immediately following supporting member 31 which member 31 also produces a gentle flattening and compressing effect upon the worked soil. The tines 20 move quite rapidly through the soil and the variable resistance to such movement which is met with causes heavy forces to be exerted by the corresponding shafts 2 upon the lower and upper ball bearings 3 and 13, the upper ball bearings 13 being particularly heavily loaded. However strong and efficient the upper bearings 13 may be, there is a danger that one or more of them will sooner or later fail and will then break up thus causing broken pieces to fall downwardly into the interior of the hollow frame portion 1. Without the provision of the features of the present invention, such broken bearing pieces, that are made of very hard metals, tend to get between the teeth and the underlying and rapidly rotating pinions 9 so that considerable further damage can be caused to the drive transmission of the implement before the original bearing failure is detected and the necessary remedial work undertaken. This danger is entirely avoided, or very greatly reduced, because each bearing 13 has beneath it the corresponding protective member 22 which, with the corresponding hood 12 and pinion hub 10 defines as annular reception chamber into which broken pieces of a failed upper ball bearing 13 will almost always drop.

Figure 5:
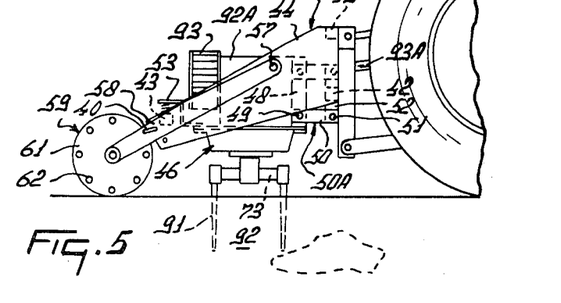
FIG. 5 is a side elevation of the implement of FIG. 4.
Figure 6:
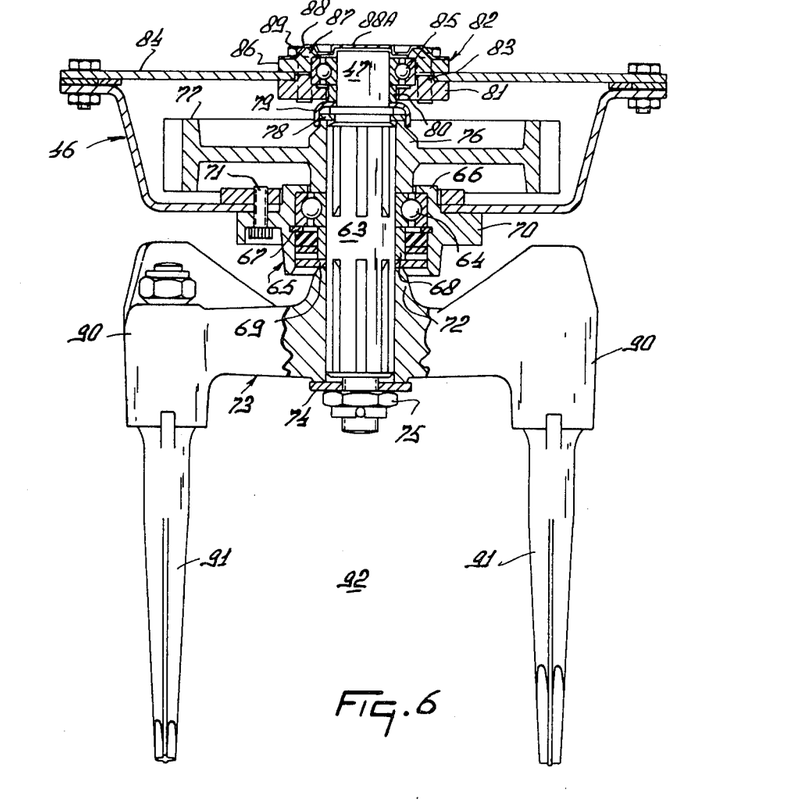
Figure 7:
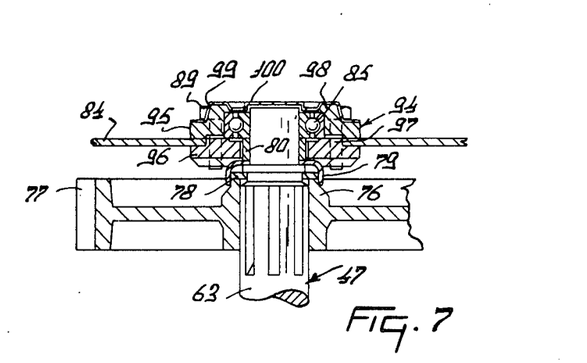
Figure 8:
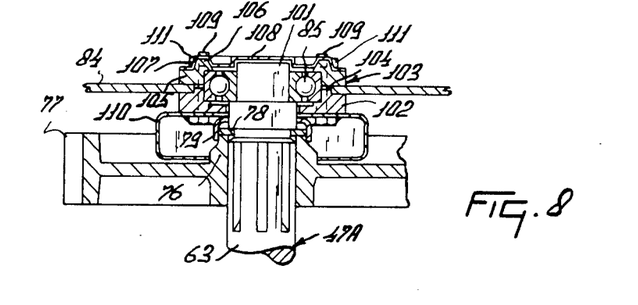
Figure 9:
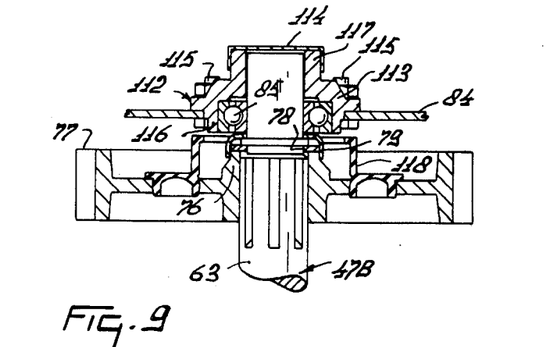
Figure 10:
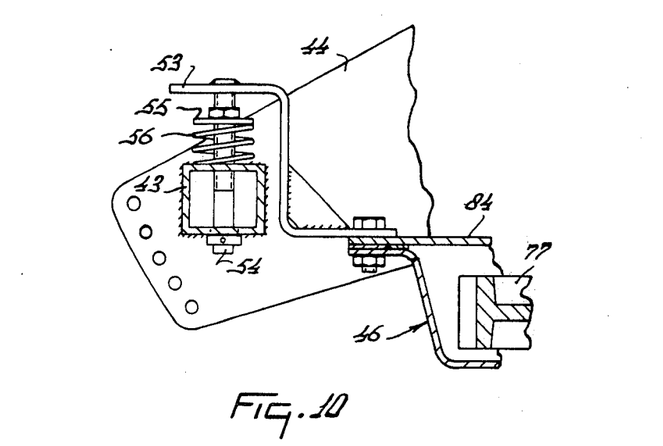
FIG. 10 is a section, to an enlarged scale, taken on the line X-X in FIG. 4.

The agricultural implement that is illustrated in FIGS. 4, 5, 6 and 10 of the accompanying drawings is again a soil cultivating implement in the form of a rotary harrow and this applies equally to the three alternative embodiments of the implement that are illustrated in FIGS. 7, 8 and 9 of the drawings. The implement has a frame that is generally indicated by the reference 41, said frame 41 comprising two horizontally or substantially horizontally disposed beams 42 and 43 that are parallel to one another and perpendicular or substantially perpendicular to the direction A with the beam 43 at a distance behind the beam 42 with respect to that direction. Although the beam 42 is usually at a slightly higher horizontal level than is the beam 43, the two beams 42 and 43 may be considered as being at substantially the same horizontal level. The opposite ends of the two beams 42 and 43 are secured to substantially vertically disposed side plates 44 of the frame 41, said side plates 44 both being substantially parallel to the direction A. The two plates 44 that interconnect the ends of the frame beams 42 and 43 are of symmetrically identical shape and this shape can be seen in side elevation in FIG. 5 of the drawings. It will be noted from FIG. 5 that each side plate 44 extends rearwardly with respect to the direction A behind the rear frame beam 43. A third frame beam 45 extends parallel to the beams 42 and 43 between the two side plates 44 and is disposed vertically above the frame beam 42 at substantially the tops of the two side plates 44. As seen in plan view (FIG. 4), a hollow frame portion 46 is disposed between the two side plates 44 in substantially parallel relationship with the beams 42, 43 and 45, said hollow frame portion 46 having rotatably mounted therein a plurality, in this case twelve, of substantially vertical or at least upwardly extending shafts 47 which shafts 47 are disposed in a single row that is parallel to the major dimension of the hollow frame portion 46.

Four upright supports 48 are provided at the top and front of the hollow frame portion 46 with respect to the direction A, two of said supports 48 being located close to the opposite ends of the frame portion while the other two are spaced apart at regular intervals between them. Upper and lower horizontal pivot pins 49 connect upper and lower regions of each support 48 to the rear ends of pairs of forwardly divergent links 50. The leading ends of the pairs of links 50 are pivotally connected by horizontal shafts 51 to upper and lower lugs 52 that project both upwardly and downwardly from the upper and lower surfaces of the frame beam 42. The axes that are defined by the upper and lower shafts 51 are parallel to those that are defined by the upper and lower pivot pins 49. Parallelogram linkages that are generally indicated by the reference 50A are thus provided and enable the hollow frame portion 46 to move upwardly and downwardly relative to the frame 41 substantially without tilting. The top and rear of the hollow frame portion 46 is provided with two stop brackets 53 (see particularly FIG. 10) at locations which are spaced equal distances inwardly from the opposite ends of the portion 46. A rearmost and uppermost horizontal part of each stop bracket 53 has the upper end of a corresponding vertical pin 54 rigidly secured to it so that the pin 54 extends downwardly therefrom. Lower regions of the two pins 54 are entered downwardly through vertically aligned holes formed in the upper and lower walls of the frame beam 43 and a retaining ring is secured to each pin 54 below the lower wall of the beam 43 so that the pin 54 cannot pass upwardly through that lower wall. An upper region of each pin 54 is screwthreaded and has a nut mounted thereon. The lower surface of the nut that corresponds to the right-hand pin 54 bears against a washer 55 and a helical compression spring 56 bears between the lower surface of the washer 55 and the upper surface of the upper wall of the frame beam 43. The spring 56 tends to urge the right-hand end of the hollow frame portion 46 upwardly relative to the frame 41 and it will be evident that this tendency is increased or decreased by adjustment of the nut washer 55 that are mounted on the upper screwthreaded region of the corresponding pin 54 in either a downward or an upward direction.

Arms 58 are turnable upwardly and downwardly alongside the relatively remote surfaces of the two side plates 44 of the frame 41 about a substantially horizontal axis that is defined by aligned pivot pins 57, or corresponding pivot bolts, which pins 57, or equivalent bolts, are located near to the tops of the side plates 44 at locations that are nearer to the fronts of those plates than they are to the rear thereof. The arms 58 extend rearwardly beyond the side plates 44 and their rearmost extremities are provided with substantially horizontally aligned bearings between which a supporting member 59 is rotatably arranged. The supporting member 59 is in the form of an open ground roller which comprises a central axially disposed support 60 carrying a plurality, such as seven, of circular support plates 61 at regular intervals along the length of the support 60, all of said plates 61 being in substantially parallel relationship with the direction A. Each support plate 61 is formed, close to its periphery, with a plurality, such as eight, of holes through which a corresponding number of elongated elements 62 are entered in such a way that each element 62 is wound helically around the axis of rotation of the member 59. The level of the axis of rotation of the supporting member 59 relative to that of the frame 41 is determined by entering horizontal locking pins 40, or equivalent bolts, through holes in the arms 58 and through chosen ones of rows of holes (FIGS. 5 and 10) that are formed in the rearmost ends of the side plates 44 at equal distances from the pivot pins 57 or equivalent bolts. The holes in the side plates 44 that are chosen for co-operation with the locking pins 40 are a principal factor in determining the maximum depth of penetration of tines 91 of soil working or cultivating members 92 of the implement into the soil that is possible during the operation of the implement.

FIG. 6 of the drawings illustrates one of the substantially vertical or at least upwardly extending shafts 47 and the corresponding soil working or cultivating member 92 in greater detail and it will be seen from that Figure that each shaft 47 projects from beneath the bottom of the hollow frame portion 46 and is provided substantially midway along its upright length, with a lower ball bearing 64 that is arranged inside a lower bearing housing 65. The lower bearing housings 65 are maintained in corresponding openings in the lower wall of the hollow frame portion 46 by vertically disposed bolts 71 that are equivalent to the previously described bolts 6. The upper end of each housing 65 is located internally of the hollow frame portion 46 and has a narrow inwardly directed lip or flange 65 against which abuts the upper end of the outer race of the corresponding lower ball bearing 64. The lower end of the same outer race abuts against a circlip 67 whose outer edge is entered in a groove formed in the cylindrical inner wall of the corresponding housing 65. A central unsplined portion 63 of each shaft 47 is surrounded by a sleeve 68 and the lower end of the inner race of the corresponding lower ball bearing 64 abuts against the upper end of this sleeve 68. The lower end of each sleeve 68 bears against the upper surface of a corresponding annular sealing ring 69 which is arranged just inside the lower end of the housing 65 concerned. As in the case of the embodiment of FIGS. 1 to 3 of the drawings, a part-resilient sealing ring surrounds each sleeve 68 between the overlying circlip 67 and the underlying annular sealing ring 69. Each lower bearing housing 65 has an outwardly directed flange 70 that is disposed substantially midway between the top and bottom of that housing and whose upper surface abuts against the lower surface of the bottom wall of the hollow frame portion 46. As can be seen in FIG. 6 of the drawings, the bolts 71 co-operate with the flange 70 in fastening the housing 65 in position relative to the lower wall of the hollow frame portion 46.

A lower portion of each shaft 47 is externally splined and co-operates with matching internal splines in the central hub 72 of a corresponding substantially horizontally disposed tine support 73. The upper ends of the hubs 72 abut against the lower surfaces of the corresponding annular sealing rings 69. The co-operating splines prevent the tine supports 73 from turning angularly relative to the shafts 47 and said supports 73 are maintained in their appointed axial positions relative to those shafts 47 by washers 74 and fastening nuts 75 that co-operate with short screw-threaded lower end portions of the shafts 47 that are of smaller diameter than the remainders of those shafts. Each fastening nut 75 is provided with positive retaining means in the form of a split pin or the like. Each shaft 47 also has an upper externally splined portion upon which is received the matchingly internally splined hub 76 of a corresponding straight-toothed or spur-toothed pinion 77. The lower ends of the hubs 76 of the pinions 77 make abutting engagement with the upper ends of the inner races of the corresponding lower ball bearings 64 and are very closely surrounded by the inner edges of the lips or flanges 66 of the housings 65, in such a way that there is only sufficient clearance to allow rotation without fouling contact. The upper end of each pinion hub 76 bears against the lower surface of a corresponding circlip 78, said circlip having its inner edge entered in a groove formed in the shaft 47 concerned between the upper end of the upper splined portion of that shaft and an overlying shoulder of said shaft that is of short axial length. An annular hood 79 of inverted cup-shaped configuration has its inner circumference in surrounding relationship with an uppermost plain portion of each shaft 47, immediately above the corresponding shoulder, and projects downwardly therefrom to surround the outer edge of the corresponding circlip 78 and to fit over the upper end of the corresponding pinion hub 76. A sleeve 80 of sort axial length surrounds the upper plain portion of each shaft 47 immediately above the corresponding hood 79, said sleeve 80 being surrounded, in turn, by a lower portion 81 of a corresponding upper bearing housing 82. Each portion 81 has an upright annular rim 83 that fitsinside an opening in an upper wall or cover plate 84 of the hollow frame portion 46. The tops of the annular rims 83 are spaced only a very short distance beneath the top surface of the upper wall or cover plate 84 and each rim 83 surrounds the outer race of a corresponding upper ball bearing 85 throughout substantially half of the height of that race. The inner race of each upper ball bearing 85 is mounted on the upper plain portion of the corresponding shaft 47 and substantially the upper half of the outer race of each bearing 85 is surrounded by an upper portion 86 of the bearing housing 82 concerned. The lower surface of each upper portion 86 of each bearing housing 82 abuts against the top of the upper wall or cover plate 84 of the hollow frame portion 46. There is only a very slight spacing between the lower surface of each upper bearing housing portion 86 and the top of the annular rim 83 of the corresponding lower bearing housing portion 81.

It can be seen in FIG. 6 of the drawings that each upper bearing housing portion 86 has an annular rim 87 at its top, said rim 87 having an inner frusto-conical surface that is downwardly convergent towards the axis of the corresponding shaft 47 in such a way that an imaginary downward extension of said surface would pass through the ring of balls of the upper ball bearing 85 concerned. The outer surface of each rim 87 is also a frusto-conical surface but this latter surface is of upwardly, rather than downwardly, tapering configuration. Each rim 87 has a flat annular surface between the upper ends of the two frusto-conical surfaces that have just been discussed, said flat annular surface being substantially perpendicular to the longitudinal axis of the corresponding shaft 47 and thus parallel to the upper wall or cover plate 84 of the hollow frame portion 46. The top of each upper portion 86 of each upper bearing housing 82 is covered, together with the upper ball bearing 85 and upper end of the shaft 47 concerned, by a metal hood 88 that may be considered as being part of the upper bearing housing 82 and that is formed from sheet metal whose thickness is substantially half a millimeter. Each metal hood 88 is formed at its center with an upward projection 88A which fits, with minimal clearance, over the end of the upper plain portion of the corresponding shaft 47 that projects a short distance upwardly beyond the corresponding bearing 85. The hoods 88 are formed to fit closely over the top surfaces of the upper bearing housing portions 86, including their annular rims 87, said hoods 88 and the upper and lower portions 86 and 81 of each bearing housing 82 being secured to one another, and to the upper wall or cover plate 84 of the hollow frame portion 46, by vertically disposed bolts 89 whose shanks co-operate with screwthreaded holes formed in the lower portions 81 of the housing 82.

The soil working or cultivating members 92 are similar in construction and arrangement to the previously described soil working or cultivating members 21 and comprise sleeve-like tine holders 90 arranged at the opposite ends of the tine supports 73 with their axes in substantially parallel relationship with the axes of rotation of the corresponding shafts 47. The holders 90 receive fastening portions of the previously mentioned tines 91, said tines 91 comprising soil working portions that extend downwardly away from the lowermost ends of the fastening portions with said soil working portions inclined rearwardly from top to bottom so as to trail to some extent with respect to the intended directions of rotation of the soil working or cultivating members 92.

One of the center pair of the row of shafts 47 has an upward extension into a gear box 92A that is mounted on top of the upper wall or cover plate 84 of the hollow frame portion 46. Bevel pinions that are not visible in the accompanying drawings place the shaft extension in driven connection, inside the gear box 92A, with a substantially horizontal shaft that is substantially parallel to the direction A. The rearmost end of the substantially horizontal shaft and the rearmost end of a parallel substantially horizontal shaft 94A both project into a change-speed gear 93 that is secured to the back of the gear box 92A. The ends of the two shafts that project into the change-speed gear 93 are both splined or otherwise keyed to allow them to co-operate with the matchingly splined or otherwise keyed hubs of exchangeable and/or interchangeable pairs of straight-toothed or spur-toothed pinions (not shown) so that the transmission ratio between the shaft 94A and the underlying shaft that is parallel thereto will depend upon the particular pair of toothed pinions that is employed in the change-speed gear 93 and the arrangement of those toothed pinions. The soil working or cultivating members 92 can thus be rotated at different speeds without having to change the input speed of rotation that is applied to the splined or otherwise keyed leading end of the shaft 94A that projects forwardly from the gear box 92A in substantially the direction A. When the implement is in use, the shaft 94A is placed in driven connection with the power take-off shaft of the operating agricultural tractor or other vehicle through the intermediary of a telescopic transmission shaft 93A which is of a construction that is known per se having universal joints at its opposite ends.

FIG. 7 of the drawings illustrates an embodiment in which each shaft 47 is rotatably supported by the corresponding lower ball bearing 64 in the same manner as has already been described with reference to FIGS. 4 to 6 of the drawings. However, in the embodiment of FIG. 7, each upper ball bearing 85 is enclosed between an upper portion 95 and a lower portion 96 of a corresponding upper bearing housing 94. Each lower portion 96 is of increased axial thickness in a region thereof in which a screwthreaded hole is formed to receive the shank of the corresponding fastening bolt 89, said bolts 89 being arranged in the same general manner as has already been described with particular reference to FIG. 6 of the drawings. Each lower portion 96 is formed at the top with an upright annular rim 97 whose outer upright edge fits the opening that is formed in the upper wall or cover plate 84 of the hollow frame portion 46 for the bearing housing 94 concerned. The height of each rim 97 is such that its upper flat surface is either coplanar with, or located just above, the top of the upper wall or cover plate 84 with the result that the lower end of the outer race of the corresponding upper ball bearing 85 is coplanar, or substantially coplanar, with the top surface of said wall or plate 84. In this embodiment, the top of each upper bearing housing portion 95 is formed with an annular rim 98 which, like each of the previously described annular rims 87, has an upwardly tapering outer frusto-conical surface and a downwardly tapering frusto-conical inner surface, said outer and inner surface being, however, more steeply inclined to the horizontal than are the corresponding surfaces of the rims 87. The lower edge of the outer frusto-conical surface of each rim 98 is located at a horizontal level just above that of a plane disposed midway between parallel planes which contain the upper and lower surfaces of the corresponding upper ball bearing 85. A protective metal hood 99 is provided for the top of each upper bearing housing 94, the hoods 99 being similar in construction, thickness and arrangement to the previously described hoods 88 except, of course, that they are shaped to fit the tops of the housing portions 95 instead of the tops of the housing portions 86. Each hood 99 includes an upward projection 100 that fits closely over the uppermost extremity of the corresponding shaft 47 that projects above the upper ball bearing 85 concerned.

FIG. 8 of the drawings illustrates a further alternative construction in which a plurality of shafts 47A that are equivalent to the previously described shafts 47 are provided, each shaft 47A being rotatably supported by a corresponding lower ball bearing 64 in the same manner as has already been described with reference to FIGS. 4 to 6 of the drawings. In the embodiment of FIG. 8 of the drawings, each shaft 47A has an uppermost plain portion 101 that extends upwardly above the top of the upper wall or cover plate 84, said portion 101 having an upper part which is surrounded by the inner race of the corresponding upper ball bearings 85 and a lower part which has a larger diameter that is substantially the same as that of the substantially central unsplined portion 63 of the shaft 47A concerned. The lower larger diameter part of each uppermost plain portion 101 is surrounded, with a minimum of clearance, by a lower portion 102 of a corresponding upper bearing housing 103. The upper surface of each bearing housing portion 102 is formed with an upright annular rim 104 whose outer edge fits in the corresponding opening in the upper wall or cover plate 84 and whose uppermost surface is located just beneath the top of that wall or plate 84 at a level substantially the same as that of a plane parallel to, and midway between, the planes that contain the upper and lower surfaces of the corresponding upper ball bearing 85. Each upper bearing housing 103 also comprises an upper portion 105 and the top thereof is formed with an annular rim 106 that, like the previously described rims 87 and 98, has both inner and outer oppositely tapering frusto-conical surfaces. An imaginary downward extension of the frusto-conical inner surface of each rim 106 substantially contains the centers of the balls that form parts of the corresponding upper bearing 85. The lower edge of the outer frusto-conical surface of each rim 106 is substantially coplanar with, or is spaced immediately above, a plane that contains the top surface of the corresponding upper ball bearing 85. Once again, a protective metal hood 107 is provided, said hood 107, like the preceding hoods being formed from sheet metal that has a thickness of substantially half a millimeter, the hood being shaped to fit the top of the corresponding bearing housing portion 105 closely and being formed with a central upward projection 108 which fits around the top of the smaller diameter part of the corresponding uppermost plain portion 101 of the shaft 47A concerned. In this embodiment, the upper and lower portions 105 and 102 of each upper bearing housing 103 are secured to one another, and to the upper wall or cover plate 84, by bolts 109 which are welded to a corresponding sheet metal ring 110. As can be seen in FIG. 8 of the drawings, each ring 110 is of U-shaped cross-section, the limbs of the U being parallel to the bottom of the lower portion 102 of the corresponding upper bearing housing 103 and to the web of the corresponding toothed pinion 77 that extends between the hub 76 and the teeth of that pinion. The web or base of the U under discussion is parallel or substantially parallel to the axis of rotation of the corresponding shaft 47A as seen in the sectional view of FIG. 8 of the drawings. The upper limb of each ring 110 has the heads of the corresponding bolts 109 welded to it and the lower limb thereof engages around an upper portion of the hub 76 of the corresponding pinion 77. Nuts 111 co-operate with the upper ends of the shanks of the bolts 109 in securing the upper and lower portions of the corresponding bearing housing 103 to one another and to the wall or plate 84 in the manner illustrated in FIG. 8.

FIG. 9 of the drawings illustrates a further alternative construction in which a plurality of shafts 47B are provided that are equivalent to the previously described shafts 47 and 47A. Each shaft 47B has an uppermost end portion that projects by a significant distance above the top of the upper wall or cover plate 84 of the hollow frame portion 46 and each upper ball bearing 85 is received in a corresponding upper bearing housing 112 that comprises two portions 113 and 114. The lower portion 113 of each upper bearing housing 112 is secured by vertically disposed bolts 115 to the margins of a corresponding opening in the upper wall or cover plate 84. Each lower portion 113 has a downwardly projecting annular stepped rim 116 whose lowermost smaller diameter step terminates at substantially the same level as the bottom of the ball bearing 85 concerned while its upper larger diameter step fits in the corresponding opening in the upper wall or cover plate 84. As in the embodiment of FIGS. 1 to 3 of the drawings, the inner race of each upper ball bearing 85 has its lower end in abutting engagement with the top of the corresponding annular hood 79 of inverted cup-shaped configuration. The lower portion 113 of each upper bearing housing 112 has an upright annular rim 117 projecting from its top surface, said rim 117, which is of sleeve-like configuration, being arranged through out substantially the whole of its length around the uppermost plain portion of the corresponding shaft 47B above the upper ball bearing 85 concerned. The upper portion 114 of each upper bearing housing is in the form of a sheet material hood which fits over the upper end of the corresponding annular rim 117, said hood preferably being formed from a synthetic plastics material or from a natural or synthetic rubber which will melt or become degraded upon the surrounding temperature to which it is subjected exceeding a predetermined value of, for example, 100° C. It will be seen from FIG. 9 of the drawings that each pinion 77 is provided with a corresponding protective member 118 of generally cylindrical configuration that is arranged coaxially around the shaft 47B concerned. The protective members 118 are substantially identical in construction and arrangement to the previously described protective members 22 and they are arranged to serve the same purpose as are the protective members 22, their uppermost ends being located at substantially the same horizontal level as are the lowermost ends of the stepped rims 116 of the bearing housing portions 113.

In the use of the implement that has been described with reference to FIGS. 4 to 10 of the accompanying drawings, the frame 41 is supported from the ground surface by the rear-mounted rotatable supporting member 59, by the tines 91 of the soil working or cultivating members 92 and by the connection of a coupling member or trestle 119 that is located at the front of the frame 41 with respect to the direction A to the three-point lifting device or hitch at the rear of an operating agricultural tractor or other vehicle. The coupling member or trestle 119 is of generally triangular configuration and is basically similar to the coupling member or trestle 33 of the embodiment of FIGS. 1 to 3 of the drawings. The level of the axis of rotation of the supporting member 59 that is chosen relative to that of the frame 41 is a principal factor in determining the maximum depth of penetration of the tines 91 into the soil that is possible during the operation of the implement and this level is controlled by the choice of holes (FIG. 10) that is made to co-operate with the horizontal locking pins 40 or equivalent bolts. The parallelogram linkages 50A by which the hollow frame portion 46 is connected to the frame 41 allow said frame portion 46 to move upwardly and downwardly relative to the frame 41 within the limits dictated by the stop brackets 53 and pins 54, downward movement at one end being resiliently opposed by the helical compression spring 56. As soon as rotary drive is applied to the leading end of the input shaft 94A of the gear box 92A, the pinions 77, shafts 47 and soil working or cultivating members 92 rotate in alternately opposite directions in the same manner as has already been described in connection with the embodiment of FIGS. 1 to 3 of the drawings having particular reference to the small arrows that are shown in FIG. 1. The tips of the two tines 91 of each member 92 are spaced apart from one another by a distance which is a little greater than the regular spacing (preferably substantially 25 centimeters) between the axes of rotation of neighbouring shafts 47, 47A or 47B so that the twelve members 92 work a single broad strip of soil. If one of the soil working or cultivating members 92 should strike a substantially immovable obstacle, such as an embedded stone, the whole hollow frame portion 46 can deflect upwardly, without significant tilting, relative to the frame 41 to allow the member 92 concerned to ride over the obstacle thus reducing the extra loading upon the bearings, and particularly, the upper bearings, of the shaft 47, 47A or 47B such a state of affairs is illustrated somewhat diagrammatically in FIG. 5 of the drawings.

It will be appreciated that the driving torque that is applied to the input shaft 94A of the gear box 92A has a tendency to turn the whole frame portion 46 and the parts which it carries about a substantially horizontial axis that is substantially coincident with the longitudinal axis of said shaft 94A. The helical compression spring 56 that is provided between only one of the stop brackets 53 and the frame beam 43 opposes this torque and thus tends to prevent the hollow frame portion 46 from tilting downwardly at one end realtive to the frame 41. The spring 56 pushed the corresponding end of the hollow frame portion 46 upwardly to some extent when its effect is not more or less counterbalanced by the torque applied to the input shaft 94A of the gear box 92A.

If one or more of the upper ball bearings 85 should be overloaded and fail as a consequence with break up of the bearing concened, the various constructions that have been described with reference to FIGS. 4 to 10 of the drawings are all such as to prevent any broken pieces of significant size from falling downwardly into the interior of the hollow frame portion 46 to locations where they could get between the teeth of the pinions 77 and cause irreparable damage to those pinions and, possibly, direct or indirect damage to other bearings. If one of the upper ball bearings 85 should brake up, the thin sheet material top of the corresponding bearing housing will, in most cases, be destroyed and this will, of course, give quick visual evidence of what has occurred and the need for attention. Moreover, any broken pieces of the failed ball bearing 85 will tend to leave the bearing housing concerned upwardly through the destroyed sheet material top thereof and, consequently, will not cause damage to the pinions 77 nor to any other shaft bearings. If, unusually, the corresponding sheet material hood 88, 99, 107 or 114 is not destroyed upon the failure of one of the bearings 85, it will most invariably be deformed either immediately or within a short time after the bearing failure because the uppermost end of the corresponding shaft 47 or 47A (in the embodiments of FIGS. 6 to 8 of the drawings) will wobble and strike the internal surface of the hood concerned. The deformation of the hood quickly provides visual evidence of the bearing failure and the need for attention.

In the embodiments of FIGS. 6 to 8 of the drawings, the lower portions 81, 96 and 102 of the corresponding upper bearing housings are made from a relatively soft cast iron that will act as a plain bearing for a shorter or longer time after the failure of the ball bearing 85 with which it is associated. The upper bearing portions 86, 95 and 105 are, on the contrary, formed from much harder grey cast iron. In the embodiment of FIG. 8 of the drawings, the hollow frame portion 46 is similar to the hollow frame portion 1 in being of greater vertical height than the hollow frame portion 46 of the embodiment of FIG. 7. Upper bearing installation is readily carried out in the embodiment of FIG. 8 because the bolts 109 and positively secured to the ring 110. Moreover, should the lower portion 102 of one of the upper bearing housings 103 have to serve temporarily as a plain bearing after failure of the corresponding ball bearing 85, the ring 110 concerned will retain any piece of that portion 102 that may break away and will prevent it from passing downwardly into the interior of the hollow frame portion 46 where it might damage the teeth of the pinions 77 and/or directly or indirectly damage other shaft bearings.

The upper ball bearing housings 112 that are employed in the embodiment of FIG. 9 of the drawings support the upper ball bearings 85 in a simple manner and, upon the failure and break up of one of those bearings 85 the temperature of the housing portion 113 rapidly rises, due to the increased frictional contact of the uppermost plain portion of the corresponding shaft 47B with the interior of the annular rim 117 of said portion 113, and this causes the upper portion 114 of the bearing housing 112, which acts as a protective hood, to melt or become degraded thus giving quick visual evidence of the location of a bearing failure and the need for attention thereto. If the bearing 85 should break up to such an extent that pieces thereof fall downwardly into the interior of the hollow frame portion 46, they will not cause damage because they will drop into the annular reception chamber that is formed between the corresponding protective member 118 and the hub 76 of the co-operating pinion 77 in the same way as has already been described with reference to FIGS. 1 to 3 of the drawings.

The embodiments that have been described with reference to FIGS. 6 to 10 of the drawings rotatably support the upper ends of the shafts 47, 47A and 47B of the soil working or cultivating members 92 in such a way as to reduce the likelihood of damage to the pinions 77 from a broken upper ball bearing to a very low level indeed. Moreover, any upper ball bearing 85 that does break up and require replacement can readily be removed and have a fresh bearing substituted therefor merely by taking off at least the upper portion of the corresponding upper bearing housing that is carried by the upper wall or cover plate 84 of the hollow frame portion 46. Moreover, the particular constructions of the upper bearing housings that have been described enable those bearing housings themselves to act as plain bearings for at least short periods of time after the failure and break up of any of the upper ball bearings 85.

While the invention has been described in its application to soil cultivating implements in the form of rotary harrows, it is considered to be self-evident that bearings which are subjected to heavy loadings in other agricultural implements could be constructed and arranged in similar manners thus protecting associated toothed pinions and other bearings from damage and, in some embodiments, giving early visual evidence of bearing failure and the need for attention.

Although certain features of the agricultural implements that have been described and/or that are illustrated in the accompanying drawings will be set forth in the following claims as inventive features, it is emphasised that the invention is not necessarily limited to those features and that it includes within its scope each of the parts of each agricultural implement embodiment that has been described, and/or that is illustrated in the accompanying drawings, both individually and in various combinations.

What we claim is:

1. An agricultural implement comprising a frame and a plurality of soil-working members journalled in a portion of said frame, said soil-working members being rotatably mounted on corresponding upwardly extending shafts and said shafts being supported by said frame portion through at least one respective bearing connection, driving means engaging said soil-working members and said driving means comprising intermeshed gears within said frame portion and below the bearing connections that support said shafts, protective means located between said bearing connections and the gears of said driving means and said protective means being positioned to intercept broken bearing fragments from fouling said gears, said protective means comprising a chamber positioned beneath each bearing connection and said chamber substantially surrounding the respective shaft and gear, said chamber being connected to the hub of said gear with release means.

2. An implement as claimed in claim 1, wherein each bearing connection includes a bearing in a housing and said housing is secured in said frame portion, said protective means extending upwardly and adjacent the bottom of each housing.

3. An implement as claimed in claim 1, wherein the bottom of said protective member has integral extensions that are gripped in holes in said gear.

4. An implement as claimed in claim 3, wherein there as two holes located at diameterically opposite sides of said pinion.

5. An implement as claimed in claim 4, wherein said extensions are substantially circular and cap-shaped in configuration.

6. An implement as claimed in claim 1, wherein said hollow frame portion is connected to the remainder of said frame by linkage means and movable upwardly and downwardly relative to the frame, a supporting roller at the rear of the frame portion being connected to said frame by arms.

7. An implement as claimed in claim 1, wherein said gears are pinion gears mounted on said shafts and said protective means is connected to the pinion gears and movable therewith.

8. An agricultural implement comprising a frame and a plurality of soil-working members journalled in a portion of said frame, said soil-working members being rotatably mounted on corresponding upwardly extending shafts and each shaft being supported by said frame portion through at least one bearing connection, driving means engaging said soil-working members and said driving means comprising intermeshed gears within said frame portion and below the bearing connections that support the shafts, protective members being located between said bearing connections and the gears of said driving means and said protective members being positioned to intercept broken bearing fragments and prevent same from fouling said gears, each bearing connection including a bearing in a housing and said housing being secured in said frame portion, each protective member extending around the respective shaft adjacent said frame portion, said protective member overlying a respective gear and defining a chamber, said member retaining fragments above said gear, said protective member being substantially cylindrical in configuration and surrounding said shaft in spaced relationship, said member being fastened to a corresponding gear.

9. An agricultural implement comprising a frame and a plurality of soil-working members journalled in a portion of said frame, said soil-working members being rotatably mounted on corresponding upwardly extending shafts and each shaft being supported by said frame portion through at least one bearing connection, driving means engaging said soil-working members and said driving means comprising intermeshed gears within said frame portion and below the bearing connections that support the shafts, protective members being located between said bearing connections and the gears of said driving means and said protective members being positioned to intercept broken bearing fragments and prevent same from fouling said gears, each bearing connection including a bearing in a housing and said housing being secured in said frame portion, each protective member extending around the respective shaft adjacent said frame portion, said protective member overlying a respective gear and defining a chamber, said member retaining fragments above said gear, said protective member being secured to said gear and extending upwardly from the gear to adjacent the bottom of said housing.

10. An implement as claimed in claim 9, wherein said protective member has a diameter that substantially equals the radius of said pinion.

11. An implement as claimed in claim 10, wherein said housing is substantially circular and said protective member has a diameter that at least equals that of the housing.

12. An implement as claimed in claim 9, wherein said shaft is rotatably supported by the lower bearing connection on a wall of said frame portion.

13. An implement as claimed in claim 12, wherein the top of a further housing for said lower connection closely surrounds a hub of the corresponding pinion on said shaft.

14. An implement as claimed in claim 9, wherein each of said shafts projects below the bottom of said frame portion and the support of a corresponding soil working member is fixed to said shaft, opposite ends of each support mounting downwardly extending tines.

15. An implement as claimed in claim 9, wherein said housing comprises two separable portions located one above the other, the lower portion being located below said cover plate and the upper portion being located above said plate.

16. An implement as claimed in claim 15, wherein said housing portions are made from cast material, said upper portion being grey cast iron and said lower portion being located beneath said cover plate and formed from a soft cast iron that forms a bearing.

17. An implement as claimed in claim 9, wherein said housing includes a protective cap which closely fits the underlying portion of that housing.

18. An implement as claimed in claim 17, wherein a central region of the sheet material that forms the upper portion of said housing includes an upward ring projection that accommodate the uppermost end of said shaft.

* * * * *